United States Patent [19]

Hettinger et al.

[11] Patent Number: 5,746,079
[45] Date of Patent: May 5, 1998

[54] METHOD FOR THE PRODUCTION OF A VALVE HOUSING

[75] Inventors: Gerhard Hettinger, Ingelfingen; Walter Rutsch, Niedernhall, both of Germany

[73] Assignee: Burkert Werke GmbH & Co., Ingelfingen, Germany

[21] Appl. No.: 722,031

[22] PCT Filed: Feb. 7, 1996

[86] PCT No.: PCT/EP96/00503

§ 371 Date: Oct. 3, 1996

§ 102(e) Date: Oct. 3, 1996

[87] PCT Pub. No.: WO96/24448

PCT Pub. Date: Aug. 15, 1996

[30] Foreign Application Priority Data

Feb. 8, 1995 [DE] Germany .............. 195 04 120.8

[51] Int. Cl.[6] ............................................. B21D 9/15
[52] U.S. Cl. ............................. 72/57; 72/54; 72/55
[58] Field of Search ............................. 72/57, 58, 54, 72/55

[56] References Cited

U.S. PATENT DOCUMENTS

| 3,300,844 | 1/1967 | Boteler | 72/55 |
| 4,580,427 | 4/1986 | Akamatsu | 72/58 |
| 5,505,068 | 4/1996 | Bartels | 72/58 |

FOREIGN PATENT DOCUMENTS

| 2722824 | 11/1978 | Germany . | |
| 255725 | 11/1986 | Japan | 72/58 |
| 531591 | 10/1976 | U.S.S.R. | 72/58 |
| 593768 | 2/1978 | U.S.S.R. | 72/57 |
| 1349820 | 11/1987 | U.S.S.R. | 72/57 |
| 2228885 | 9/1990 | United Kingdom . | |
| 94/20234 | 9/1994 | WIPO . | |

*Primary Examiner*—David Jones
*Attorney, Agent, or Firm*—Sixbey, Friedman, Leedom & Ferguson; David S. Safran

[57] ABSTRACT

For the production of a metallic valve member a tube section (10) is introduced into a pressing mold (14) and deformed by means of a stamp (15). The ends of the tube section remain as tubular port connections. The center section intermediate these ends is thrust inwardly on the side of the tube section, which corresponds to the bottom of the valve member, whereas on the opposite side of the tube section a flat opposite surface (14a) of the pressing mold forms a flat in the wall of the tube section so that opposite to the flat two fluid guide surfaces are formed, which starting from the axial direction as defined by the port connections are directed axially inward and simultaneously toward the flat and merge together in a common rib opposite the flat. In the part corresponding to the flat, of the deformed wall of the tube section opposite to the rib a passage is produced, the remaining part, surrounding the passage, of the flat constituting a connection flange and the flow paths formed by the fluid guide surfaces opening into the passage.

19 Claims, 5 Drawing Sheets

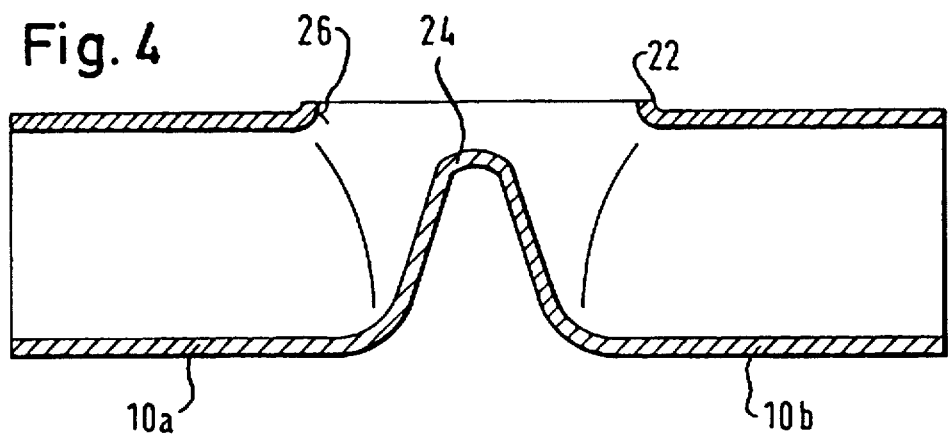
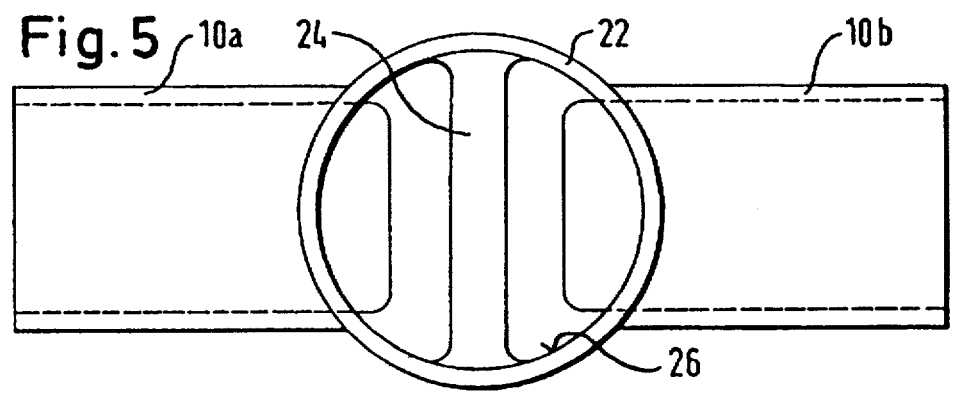
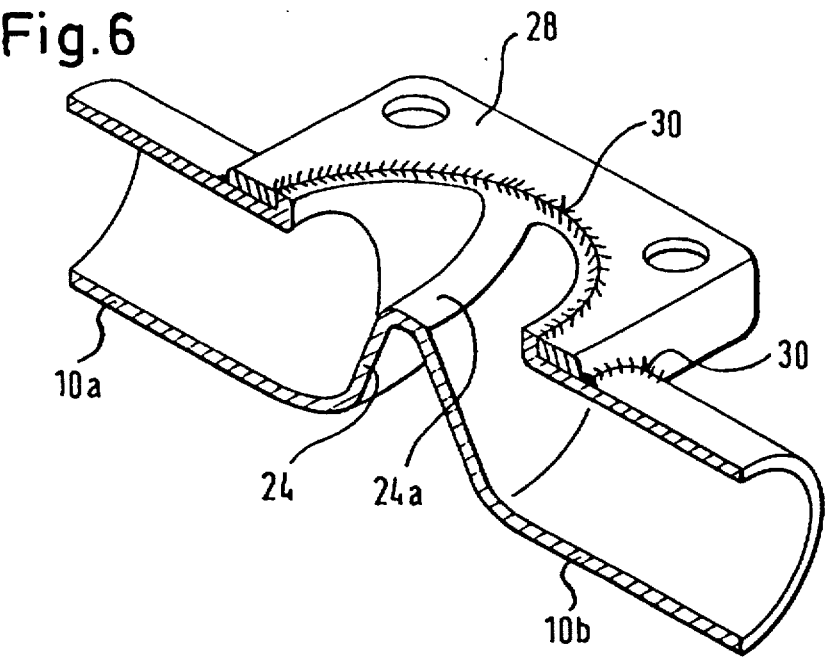

METHOD FOR THE PRODUCTION OF A VALVE HOUSING

The invention relates to a method for the production of a valve housing with a metallic valve member.

Metallic valve members have so far overwhelmingly been produced by casting steel or aluminum and by pressing brass or forging valve blanks of steel, which are machined. In the case of cast valve blanks the homogeneity of the metal structure is unsatisfactory. There is a tendency toward carbide precipitation, intercrystalline corrosion, blowhole formation, inclusions and other structural flaws in the material. Such flaws may lead to contamination of process lines, leaks in a valve or damage thereof by corrosion. Moreover the welding properties of such valve members leave to be desired. In the case of valve members produced by pressing brass or forging steel such defects are substantially prevented, but however forging methods are extremely involved, since the entire internal space in the valve member must be produced by machining.

The U.S. Pat. No. 3,300,844 discloses producing a metallic valve housing by shaping a cylindrical tube section in an embossing mold. The shaping operation is however performed in a plurality of steps and can not be carried out while the material is cold. It requires the introduction of counter-stamps into the interior of the tube section for the formation of concave surfaces. This known method as well is complex.

The invention is to provide a method for the production of a valve housing comprising a metallic valve member, which may be implemented with a fraction of the effort or complexity of a conventional forging or shaping method and leads to valve members which are free of defects occurring with valve members produced by casting methods and furthermore only require minimum use of material.

In accordance with the method of the invention for the production of a valve housing having a metallic valve member a cylindrical tube section, which is charged with a filling material and at its ends is closed by obturating stamps, is placed in a pressing mold and deformed in the pressing mold by means of a stamp, which acts perpendicularly to the axis of the tube section from the outside and in the interior of the tube section produces the pressure necessary for shaping, which pressure is transmitted by the filling material to the internal wall surface of the tube section, the ends of the tube section remaining as tubular port connections and the center section intermediate the ends on one side of the tube section, which corresponds to the bottom of the valve member, being thrust inward with the formation of a concave surface, whereas on the oppositely placed side of the tube section an opposite surface of the pressing mold forms a flat in the wall of the tube section so that opposite to the flat two fluid guide surfaces are formed, which starting from the axial direction as defined by the port connections are directed axially inward and furthermore toward the flat and also converge in a common rib placed opposite to the flat; after removal of the filling material in the part, which corresponds to the flat, of the deformed wall surface of the tube section opposite to the rib at least one passage is produced, the part, remaining and surrounding the passage, of the flat forming a connection surface and the flow paths formed by the fluid guide surface opening into the passage.

Metal tubes of suitable quality and material composition are available for all imaginable valve applications. The deformation of a tube section by the action of pressure from the outside is without any disadvantageous effect on the nature of the material. A machining operation is unnecessary. The wall thickness of the valve member is nowhere greater than necessary so that there is an economy in weight and material. The valve members produced using the method of the invention possess similar advantages to those manufactured using conventional forging techniques, at the same time having costs of production which are only a small fraction of those involved on the application of forging methods.

There has already been a proposal to shape tubular valve blanks by the application of extremely high hydrostatic internal pressures to make valve members. Such shaping methods however do require the use of excessively elaborate machines capable of producing an internal pressure in excess of 800 bar, at which the material starts to flow. However substantially higher pressures are required to shape fine surface details.

On the other hand in the method of the invention the wall of the tube section is merely bent and, to a certain extent, stretched. This is performed by the action of an external force, which deforms the tube, and a internal hydraulic pressure then resulting, which makes the opposite wall surface of the tube conform to an external mold or form.

For the performance of the method it has turned out to be an advantage, if the tube section, prior to the deformation thereof, is completely charged with a filling material, which after the end of deformation is removed again. During the deformation the tube section is closed at its ends by obturating stamps introduced thereinto in order to preclude escape of the filling material. A particularly well suited filling material is sand; even better results are to be obtained with a plastic material such as wax and more particularly stearin or with an elastic composition such as rubber or elastomer.

Further advantageous developments of the invention are defined in the dependent claims.

Further features and advantages of the invention will be gathered from the following description and from the drawings, to which reference is had.

FIG. 1 diagrammatically shows a blank in the form of a tube section and held closed at its ends by matingly inserted obturating stamps, between a pressing mold and a stamp.

FIG. 1a shows a possible modification of the arrangement depicted in FIG. 1.

FIG. 2 diagrammatically shows a tube section deformed as a blank in an axial sectional view.

FIG. 4 shows the blank after the cutting away of a wall part, in the form of a circular disk, in the axial section.

FIG. 5 shows the blank of FIG. 4 in plan view.

FIG. 6 shows a sectioned perspective view of a finished metallic valve member.

Figure 1:
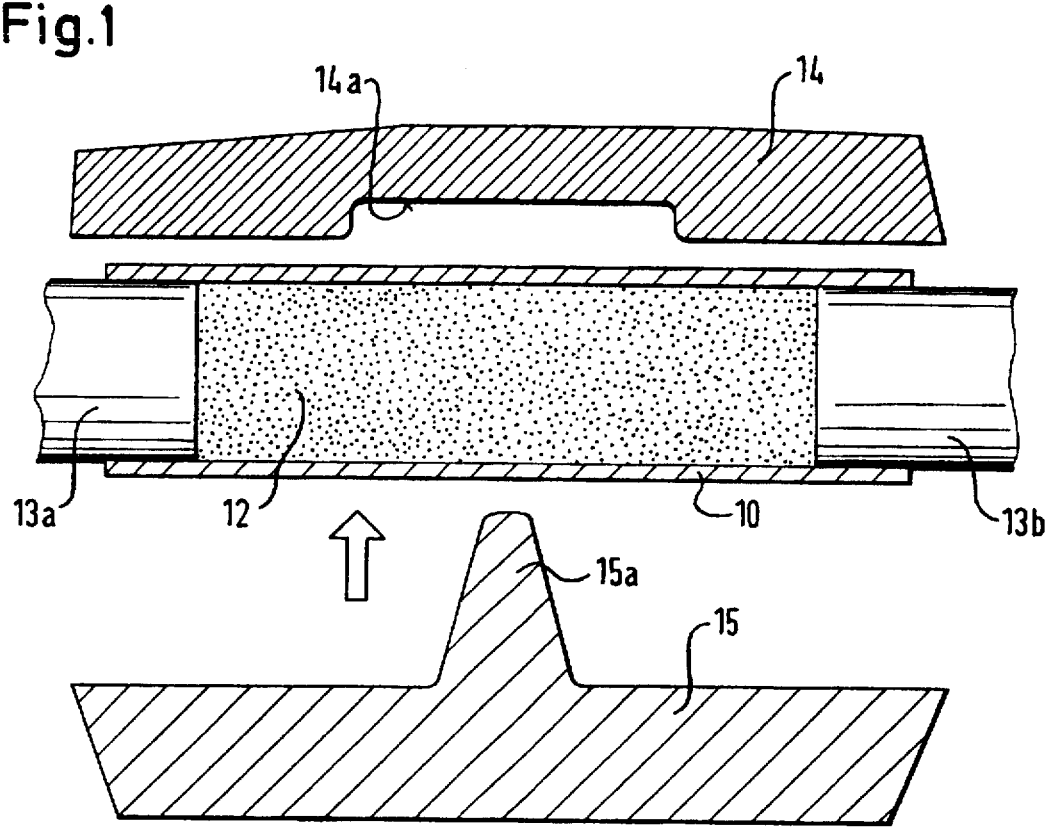

In the method of the invention a tube section 10 of suitable metallic material is firstly completely charged or filled with a filling material 12 such as sand or wax. The tube section 10 is then introduced into a pressing mold, which comprises a die or female element 14 and a stamp 15. By means of two obturating stamps 13a and 13b matingly introduced into the ends of the tube section 10, the filling material is prevented from escaping. The die 14 possesses a circular pit 14a with a flat bottom in the illustrated embodiment of the invention. Opposite to this pit 14a the stamp 15 possesses a hump 15a. The stamp 15 is thrust in the direction indicated by an arrow in FIG. 1 toward the tube section 10, which is supported in the die 14. The hump 15a thrusts the center section of the wall of the tube section, placed intermediate the ends thereof, inward as far as a point adjacent to the opposite internal surface of the tube section. Simultaneously the wall part, opposite to the hump 15a, of the tube section 10 is thrust into the pit 14a in the die 14. The result of this deformation of the tube section 10 is indicated in FIG. 2. Initially the blank so produced has two port connections 10a and 10b, which have remained tubular, at its ends and in between a center section 10c which constitutes the actual valve member. It comprises a hump-like, inwardly deformed wall section, which internally has two fluid guide surfaces 16 and 18, and an oppositely placed flat 20, which has the configuration of a circular disk and protrudes from the peripheral surface of the tube section 10 in an outward direction, an annular collar 22 being formed. The fluid guide surfaces 16 and 18 converge to a common rib 24 opposite to the flat 20.

As shown in FIG. 4, the wall part, which corresponds to the circular disk-like flat 20, is then cut off, the annular collar 22 remaining. This annular collar 22 now constitutes the rim of a passage 26, which as seen in plan view is circular. Through the same it is possible to see the rib 24, which—as shown in FIG. 5 —extends perpendicularly to the axis of the tube section 10 and at its two ends smoothly merges with the rim of the passage 26. As the perspective view of FIG. 6 indicates, the rib 24 is curved concavely, while still having a flat sealing surface 24a.

For finishing the metallic valve member a rectangular flange plate 28, which has an opening corresponding to the external diameter of the ring collar 22, is mounted around the annular collar 22 and secured in place, more particularly by weld seams 30.

Figure 7:
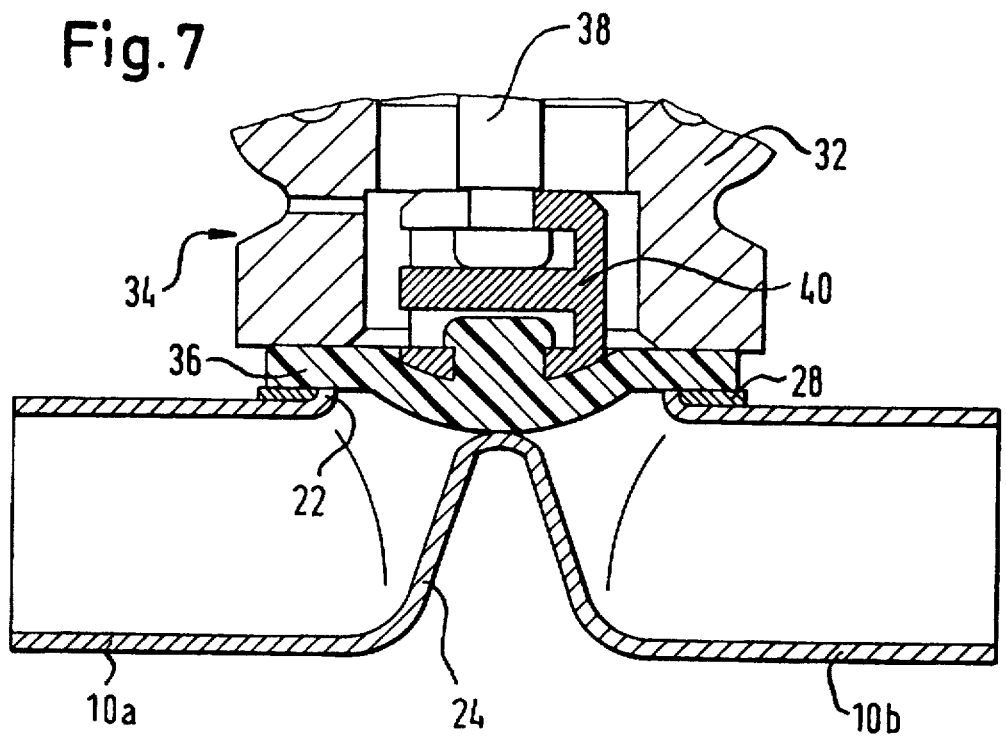
FIG. 7 shows an axial section taken through a throughflow diaphragm valve produced using the valve member.

The valve member so produced is suitable for producing a through-flow diaphragm valve of the type depicted in FIG. 7. Between the flange plate 28 and the housing 32 of a conventional valve drive 34, which is only illustrated in part, a diaphragm 36 is held, against which an actuating plunger 38 of the valve drive 34 acts by way of a coupling part 40. In the case of the closed state illustrated in FIG. 7, the diaphragm is held in sealing engagement with the rib 24. In this condition the valve drive 34 is activated. When the valve drive 34 is not activated, the diaphragm 36 is moved clear from the rib 24; the valve is then in its opened position.

Although a through-flow diaphragm valve of this type is also suitable for contaminated media, it does require a high drive power.

Figure 1A:
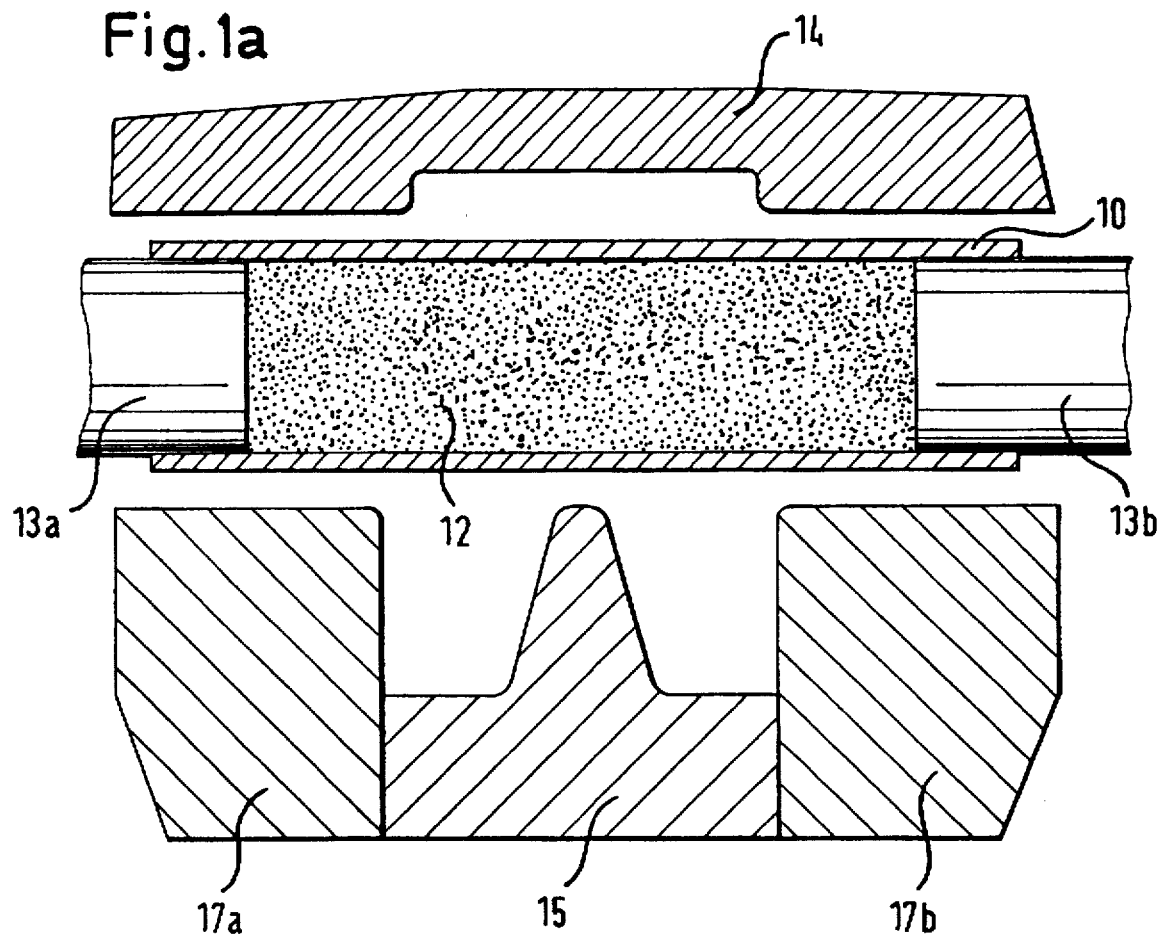
Figure 8:
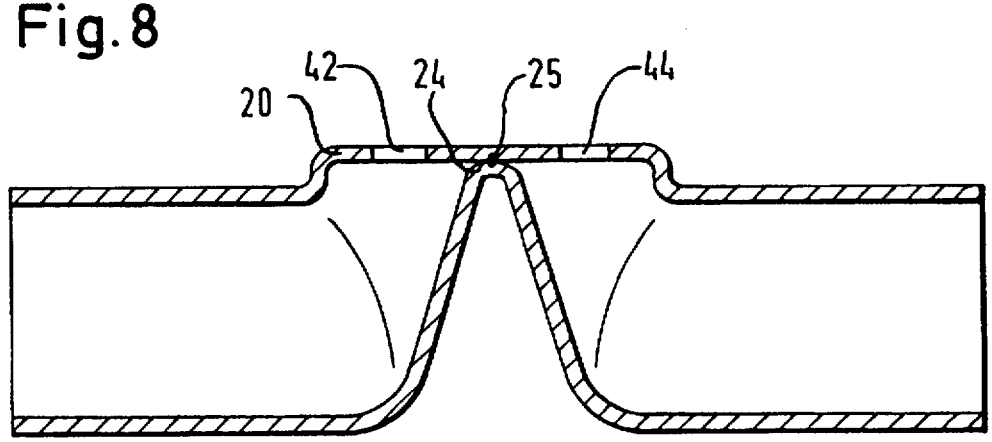
FIG. 8 shows a possible modification of the blank intended for a seat valve.

In the case of the modification, depicted in FIG. 1a, of the device for performing the method the stamp 15 is guided between two mold parts 17a and 17b, same supporting it from the sides. Seat valves require a very much smaller drive power, which can be further reduced by the use of pilot valves. The method of the invention is also suited for the production of valve members for seat valves. FIG. 8 shows a valve member for a seat valve. In the case of this valve member the rib 24 is thrust as far as the internal side of the flat 20 and welded here for sealing at 25. In the flat 20 two passages 42 and 44 are provided at a distance from one another.

FIGS. 9 through 12 show a seat valve with a metallic valve member manufactured using the method of the invention.

Figure 2:
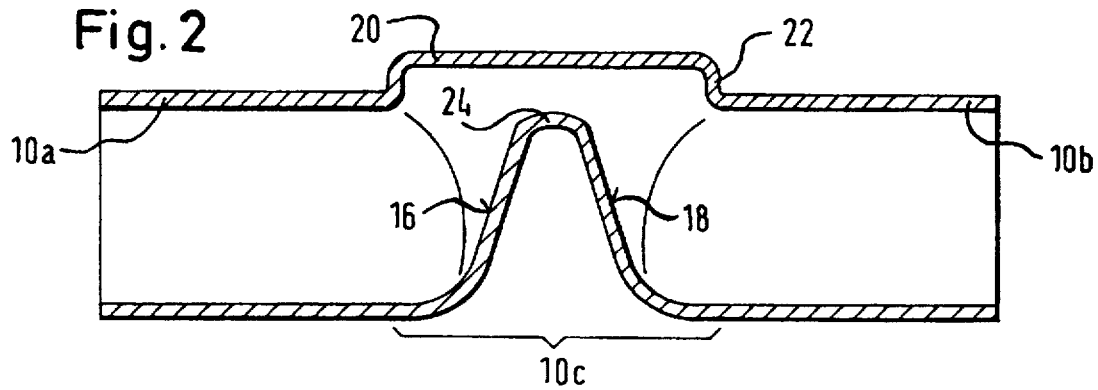
Figure 3:
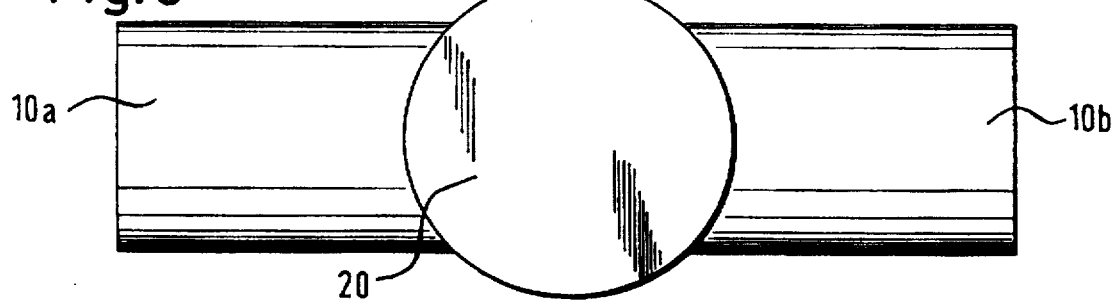
FIG. 3 shows the blank in a plan view.

In the case of this working embodiment the manner of proceeding is in principle the same as indicated in FIGS. 1 and 2; the wall part constituting the bottom of the valve member is however thrust farther inward until it abuts the oppositely placed flat 20, where it is welded for providing a seal. Furthermore two separate passages 42 and 44 produced by drilling are arranged in the flat 20. The fluid guide surface 16 extends somewhat more steeply than in the previously described design, and starting at the port connection 10b the fluid guide surface 18 firstly possesses a steeply rising part, then a point of inflection and a less steep section and following this then a steeply inclined part.

A rectangular valve plate 50 is placed in engagement with the flat 20 of the valve member, such flat being opposite to the fluid guide surfaces 16 and 18 and constituting a connection flange. It is provided with two channels 52 and 54, that are aligned with the passages 42 and 44. These channels 52 and 54 are respectively surrounded by a sealing ring. The channel 52 opens into an annular space 56, which is formed between the valve plate 50 and the housing 58 of a valve drive 60 mounted on the valve plate 50. The annular space 56 surrounds a sealing seat 62, into which the narrowing channel 54 opens. An obturating member 64, operated by the valve drive 60, cooperates with the seal seat 62.

The entire valve member is surrounded by a casing 66, same also covering over the valve plate 50.

Figure 12:
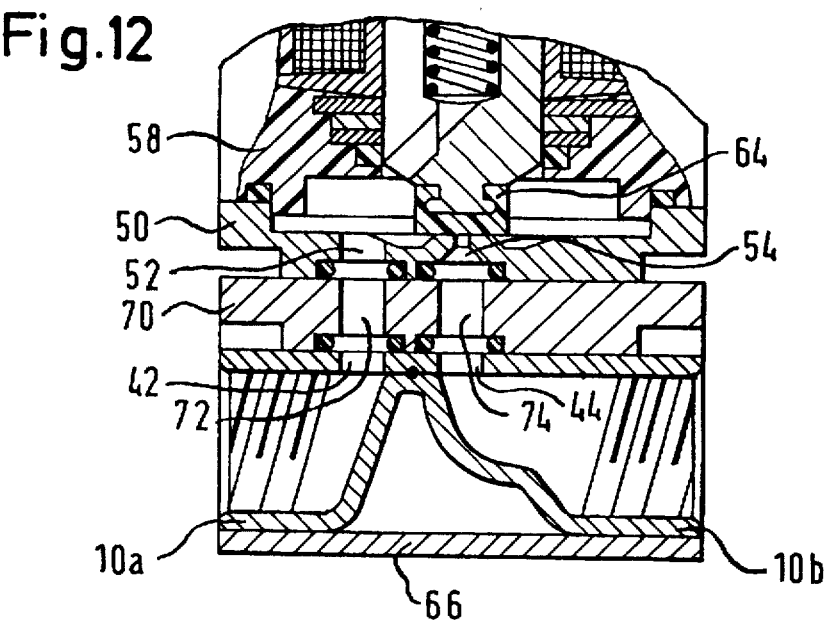
FIG. 12 is a part-section of further possible form of the seat valve.
Figure 9:
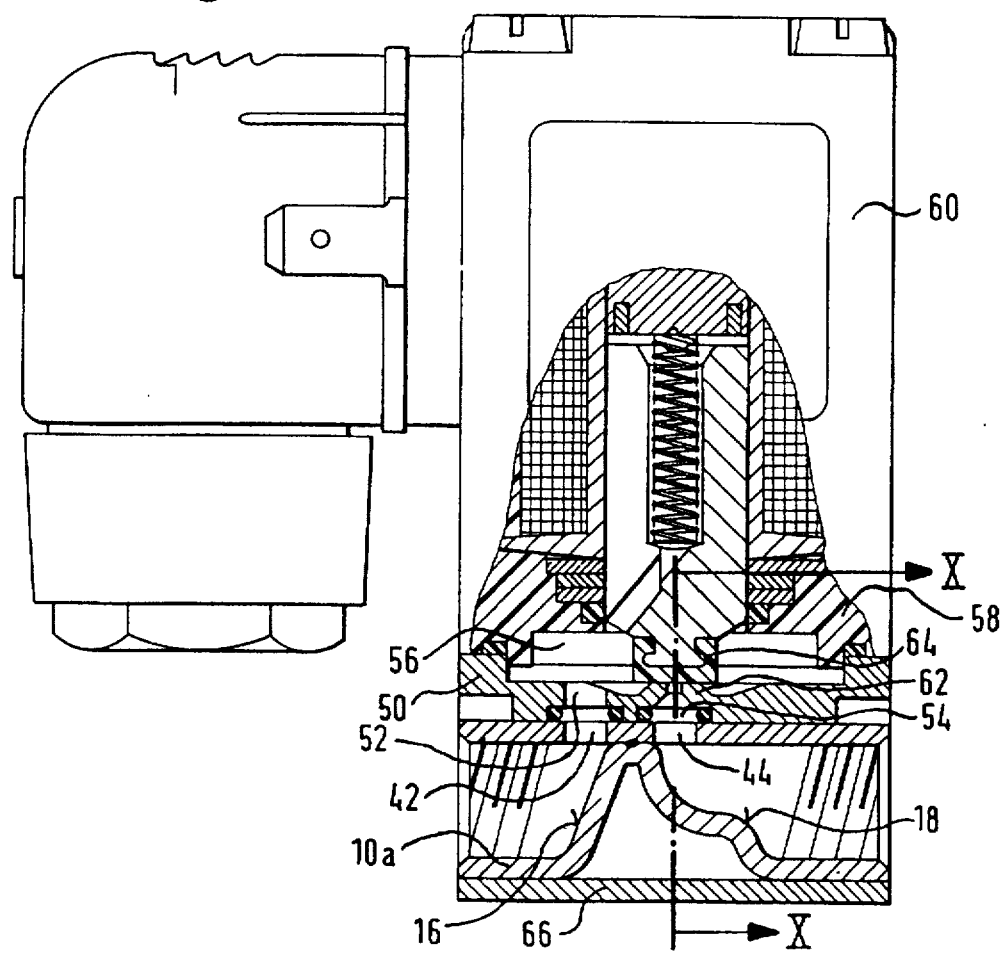
FIG. 9 shows a diagrammatic sectional view of a seat valve having a valve member adapted to such valve form.
Figure 10:
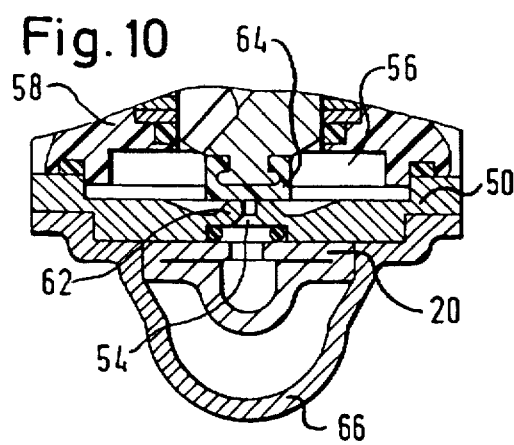
FIG. 10 is a section taken on the line X—X of FIG. 9.
Figure 11:
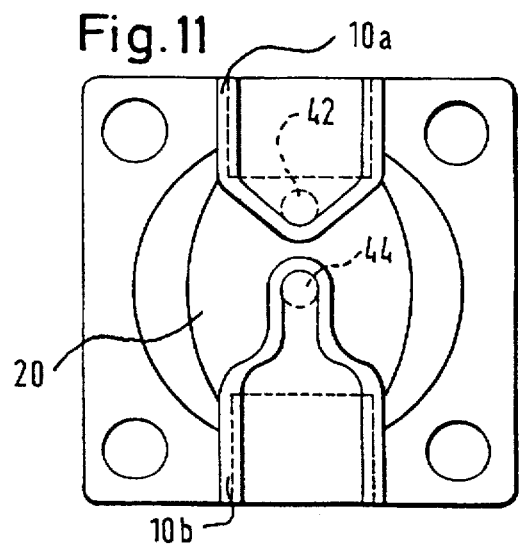
FIG. 11 is a plan view of the bottom of the valve member.

In the case of the modified design illustrated in FIG. 12 an intermediate plate 70 is mounted between the valve plate 50 and the valve member, which is designed in the same manner as in the previously described embodiment. This intermediate plate 70 is provided with two through channels 72 and 74, which are aligned with the passages 42 and 44 and join with the channels 52 and 54 in the valve plate 50. This intermediate plate 70 opens up the possibility of accommodating chokes, and sensors such as pressure, flow rate and temperature sensors or arranging for points of intersection for metering or taking samples. The intermediate plate 70 may be installed or removed without removing the valve member from a pipe system. In the case of conventional designs of valves the sealing seat is on the other hand formed in the interior of the valve member so that for the removal or installation of sensors and the like the valve member must be removed from the pipe system.

We claim:
1. A method for the production of a valve housing comprising a metallic valve member by shaping of a cylindrical tube section comprising the following steps:
A) charging a cylindrical tube section with a filling material and closing opposite ends of the cylindrical tube section with obturating stamps;
B) placing the cylindrical tube section in a pressing mold after said charging and closing thereof;
C) shaping the cylindrical tube section within the mold in a single step while the cylindrical tube section is cold, said shaping being performed with a pressing stamp acting on the outside of the tube section perpendicularly to a longitudinal axis thereof and thrusting a tube wall of the tube section inward against the filling material and the filling material transmitting shaping pressure to an internal wall surface of the tube section, resulting in ends of the tube section being as tubular port sections by said obturating stamps and a center section between said ends being thrust inward forming a rib-shaped concave surface corresponding to a bottom of the valve member and an opposite side of the tube section being shaped by said mold into a flat, the concave surface forming two guide surfaces which converge inwardly toward said flat in a direction from said ends of the tube section;

D) removing the filling material from the shaped tube section;

E) forming at least one passage opening in said flat into which a flow path along said guides surfaces is directed and a connection surface surrounding the at least one opening.

2. The method for the production of a valve housing according to claim 1, wherein said flat is formed by outwardly deforming a peripheral surface portion of the tube section.

3. The method for the production of a valve housing according to claim 1, wherein sand is used as said filling material in said charging step.

4. The method for the production of a valve housing according to claim 14, wherein a composition with a wax-like plastic nature is used as said filling material in said charging step.

5. The method for the production of a valve housing according to claim 14, wherein an elastically deformable composition is used as said filling material in said charging step.

6. The method for the production of a valve housing according to claim 1, wherein said connection surface is formed into an annular connection flange for clamping of a diaphragm in place; and wherein the rib-shaped concave surface is shaped to form a sealing surface for the diaphragm, extending diametrically across said passage opening, crosswise to a longitudinal axis of the tube section.

7. The method for the production of a valve housing according to claim 6, wherein the flat is formed into a circular disk shape, thrusting outward from the peripheral surface of the tube section; and wherein the step of forming said at least one passage is performed by cutting off a circular part of the disk shaped flat.

8. The method for the production of a valve housing according to claim 7, comprising the further step of attaching a flange plate with an opening to a wall forming a rim of the passage with the periphery of the opening matched to the periphery of the rim.

9. The method for the production of a valve housing according to claim 1, wherein two spaced passages are formed during the step of forming at least one passage, each of said passages being aligned with a respective one of the two guide surfaces; and comprising the further step of welding the rib-shaped concave surface to said rib to an internal surface of said flat.

10. The method for the production of a valve housing according to claim 9, wherein comprising the step of mounting a valve plate on said flat, said valve plate having two channels extending therethrough which are aligned with the passages during said mounting step, a first of said channels opening into a seal seat and the second of said channels opening into an annular space surrounding the seal seat.

11. The method for the production of a valve housing according to claim 10, comprising the step of inserting an intermediate plate, which is provided with continuous channel sections aligned with the passages, between the valve member and the valve seat.

12. The method for the production of a valve housing according to claim 11, comprising the further step of providing the valve member with a casing.

13. The method for the production of a valve housing according to claim 6, wherein sand is used as said filling material in said charging step.

14. The method for the production of a valve housing according to claim 6, wherein a composition with a wax-like plastic nature is used as said filling material in said charging step.

15. The method for the production of a valve housing according to claim 6, wherein an elastically deformable composition is used as said filling material in said charging step.

16. The method for the production of a valve housing according to claim 6, wherein two spaced passages are formed during the step of forming at least one passage, each of said passages being aligned with a respective one of the two guide surfaces; and comprising the further step of welding the rib-shaped concave surface to said rib to an internal surface of said flat.

17. The method for the production of a valve housing according to claim 16 wherein comprising the step of mounting a valve plate on said flat, said valve plate having two channels extending therethrough which are aligned with the passages during said mounting step, a first of said channels opening into a seal seat and the second of said channels opening into an annular space surrounding the seal seat.

18. The method for the production of a valve housing according to claim 17, comprising the step of inserting an intermediate plate, which is provided with continuous channel sections aligned with the passages, between the valve member and the valve seat.

19. The method for the production of a valve housing according to claim 18, comprising the further step of providing the valve member with a casing.

* * * * *